(12) United States Patent
Krueger et al.

(10) Patent No.: US 11,114,721 B2
(45) Date of Patent: Sep. 7, 2021

(54) ENCLOSURE ASSEMBLY MID-TRAYS FOR ELECTRIFIED VEHICLE BATTERY PACKS

(71) Applicant: FORD GLOBAL TECHNOLOGIES, LLC, Dearborn, MI (US)

(72) Inventors: Kyle Krueger, Dearborn, MI (US); Patrick Daniel Maguire, Ann Arbor, MI (US); Mohammadreza Eftekhari, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 187 days.

(21) Appl. No.: 15/872,082

(22) Filed: Jan. 16, 2018

(65) Prior Publication Data

US 2019/0221793 A1 Jul. 18, 2019

(51) Int. Cl.
*H01M 50/20* (2021.01)
*H01M 50/24* (2021.01)
*H01M 50/502* (2021.01)
*H01M 10/42* (2006.01)

(52) U.S. Cl.
CPC ......... *H01M 50/20* (2021.01); *H01M 10/425* (2013.01); *H01M 50/24* (2021.01); *H01M 50/502* (2021.01); *H01M 2010/4271* (2013.01); *H01M 2220/20* (2013.01)

(58) Field of Classification Search
CPC ....... H01M 10/425; H01M 2010/4271; H01M 2/1077; H01M 2/043; H01M 2/206; H01M 2/1083; H01M 50/20; H01M 50/249; H01M 50/502; B60R 16/04; B60R 16/03; B60R 16/033
See application file for complete search history.

(56) References Cited

U.S. PATENT DOCUMENTS

| | | | |
|---|---|---|---|
| 4,444,853 A * | 4/1984 | Halsall | G03F 1/90 429/177 |
| 5,886,501 A | 3/1999 | Marks et al. | |
| 8,353,970 B2 | 1/2013 | Wells et al. | |
| 9,581,270 B2 | 2/2017 | Peterson | |
| 2005/0196669 A1* | 9/2005 | Lee | H01M 2/026 429/163 |
| 2012/0129024 A1* | 5/2012 | Marchio | H01M 10/613 429/87 |
| 2012/0301747 A1* | 11/2012 | Han | H01M 50/256 429/7 |
| 2013/0189549 A1* | 7/2013 | Nemoto | H01G 11/14 429/7 |
| 2014/0315069 A1* | 10/2014 | Kim | H01M 2/1094 429/149 |
| 2014/0335401 A1* | 11/2014 | Wohrle | H01M 2/0262 429/163 |
| 2014/0356671 A1 | 12/2014 | Dawley et al. | |

(Continued)

FOREIGN PATENT DOCUMENTS

EP 2 919 295 A1 9/2015

*Primary Examiner* — Maria Laios
(74) *Attorney, Agent, or Firm* — David B. Kelley; Carlson, Gaskey & Olds

(57) ABSTRACT

A battery pack includes a battery array and an enclosure assembly housing the battery array. The enclosure assembly includes a tray, a cover, and a mid-tray. A plurality of internal components are secured within the mid-tray to establish an electrical subassembly within the enclosure assembly.

15 Claims, 7 Drawing Sheets

(56) References Cited

U.S. PATENT DOCUMENTS

| | | | | |
|---|---|---|---|---|
| 2015/0072174 A1* | 3/2015 | DeKeuster | B60R 16/03 | 429/7 |
| 2015/0221914 A1* | 8/2015 | Page | H01M 2/1252 | 429/82 |
| 2015/0280293 A1* | 10/2015 | Guignard | H01M 2/1088 | 429/120 |
| 2016/0036029 A1* | 2/2016 | Tononishi | H01M 2/1077 | 429/121 |
| 2016/0043448 A1* | 2/2016 | Fritz | H01M 2/206 | 429/90 |
| 2016/0133896 A1* | 5/2016 | Baek | H01M 2/1077 | 429/72 |
| 2016/0197383 A1* | 7/2016 | DeKeuster | H01M 2/1072 | 429/90 |
| 2017/0317332 A1 | 11/2017 | DeKeuster et al. | | |

* cited by examiner

ENCLOSURE ASSEMBLY MID-TRAYS FOR ELECTRIFIED VEHICLE BATTERY PACKS

TECHNICAL FIELD

This disclosure relates to electrified vehicle battery packs, and more particularly to a battery pack enclosure assembly that utilizes a mid-tray for establishing an electrical subassembly inside the battery pack enclosure assembly.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. An enclosure assembly of the battery pack houses a plurality of battery cells that store energy for powering these electrical loads. Various other internal components, including but not limited to a battery electric control module (BECM), a bussed electrical center (BEC), wiring, and I/O connectors, must also be housed inside the enclosure assembly. The amount of available space within a vehicle for packaging the battery pack is somewhat limited. It is therefore desirable to improve the packaging density and ease of assembly of battery packs.

SUMMARY

A battery pack according to an exemplary aspect of the present disclosure includes, among other things, a battery array and an enclosure assembly housing the battery array and including a tray, a cover, and a mid-tray. A plurality of internal components are secured within the mid-tray to establish an electrical subassembly within the enclosure assembly.

In a further non-limiting embodiment of the foregoing battery pack, the tray is an expanded polymer-based tray.

In a further non-limiting embodiment of either of the foregoing battery packs, the mid-tray is an expanded polymer-based mid-tray.

In a further non-limiting embodiment of any of the forgoing battery packs, the mid-tray is made of expanded polypropylene.

In a further non-limiting embodiment of any of the forgoing battery packs, the cover is a solid polymer-based cover.

In a further non-limiting embodiment of any of the forgoing battery packs, the cover is made of a sheet moulding compound.

In a further non-limiting embodiment of any of the forgoing battery packs, the plurality of internal components include a bussed electrical center (BEC) secured within a pocket of the mid-tray.

In a further non-limiting embodiment of any of the forgoing battery packs, the plurality of internal components include a battery electric control module (BECM) secured within a pocket of the mid-tray.

In a further non-limiting embodiment of any of the forgoing battery packs, the plurality of internal components include a wiring harness or a wiring loom secured within a channel of the mid-tray.

In a further non-limiting embodiment of any of the forgoing battery packs, the plurality of internal components include a I/O connector secured within a core hole of the mid-tray.

In a further non-limiting embodiment of any of the forgoing battery packs, the mid-tray is secured and sealed to the tray, and the cover is received in nesting fashion with the mid-tray.

In a further non-limiting embodiment of any of the forgoing battery packs, one of the plurality of internal components is received within a pocket of the mid-tray, is retained in an X direction and a Y direction by pocket walls, and is retained in a Z direction by a protrusion that protrudes inwardly form one of the pocket walls.

In a further non-limiting embodiment of any of the forgoing battery packs, one of the plurality of internal components is received within a channel of the mid-tray, is retained in an X direction and a Y direction by channel walls, and is retained in a Z direction by a protrusion that protrudes inwardly form one of the channel walls.

In a further non-limiting embodiment of any of the forgoing battery packs, the plurality of internal components includes a bussed electrical center (BEC), a battery electric control module (BECM), a wiring harness, and an I/O connector.

In a further non-limiting embodiment of any of the forgoing battery packs, one of the plurality of internal components includes a flange that is seated within a receiving pocket molded into the mid-tray.

A method according to another exemplary aspect of the present disclosure includes, among other things, establishing an electrical subassembly inside a battery pack enclosure assembly. The electrical subassembly includes a mid-tray and a plurality of internal components secured within the mid-tray.

In a further non-limiting embodiment of the foregoing methods, establishing the electrical subassembly includes positioning a bussed electrical center (BEC) within a first pocket of the mid-tray.

In a further non-limiting embodiment of either of the foregoing methods, establishing the electrical subassembly includes positioning a battery electric control module (BECM) within a second pocket of the mid-tray.

In a further non-limiting embodiment of any of the foregoing methods, the method includes routing and securing a first wiring harness within a first channel of the mid-tray and then connecting the wiring harness to the BEC.

In a further non-limiting embodiment of any of the foregoing methods, establishing the electrical subassembly includes positioning a wiring loom within a channel of the mid-tray, snaking the wiring loom through a core opening of the mid-tray, and then connecting an I/O connector to the wiring loom.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. An exemplary battery pack of this disclosure includes a battery array and an enclosure assembly that houses the battery array. The enclosure assembly includes a tray, a cover, and a mid-tray. A plurality of internal components can be secured relative to the mid-tray to establish an electrical subassembly within the enclosure assembly. These and other features are discussed in greater detail in the following paragraphs of this detailed description.

Figure 1:
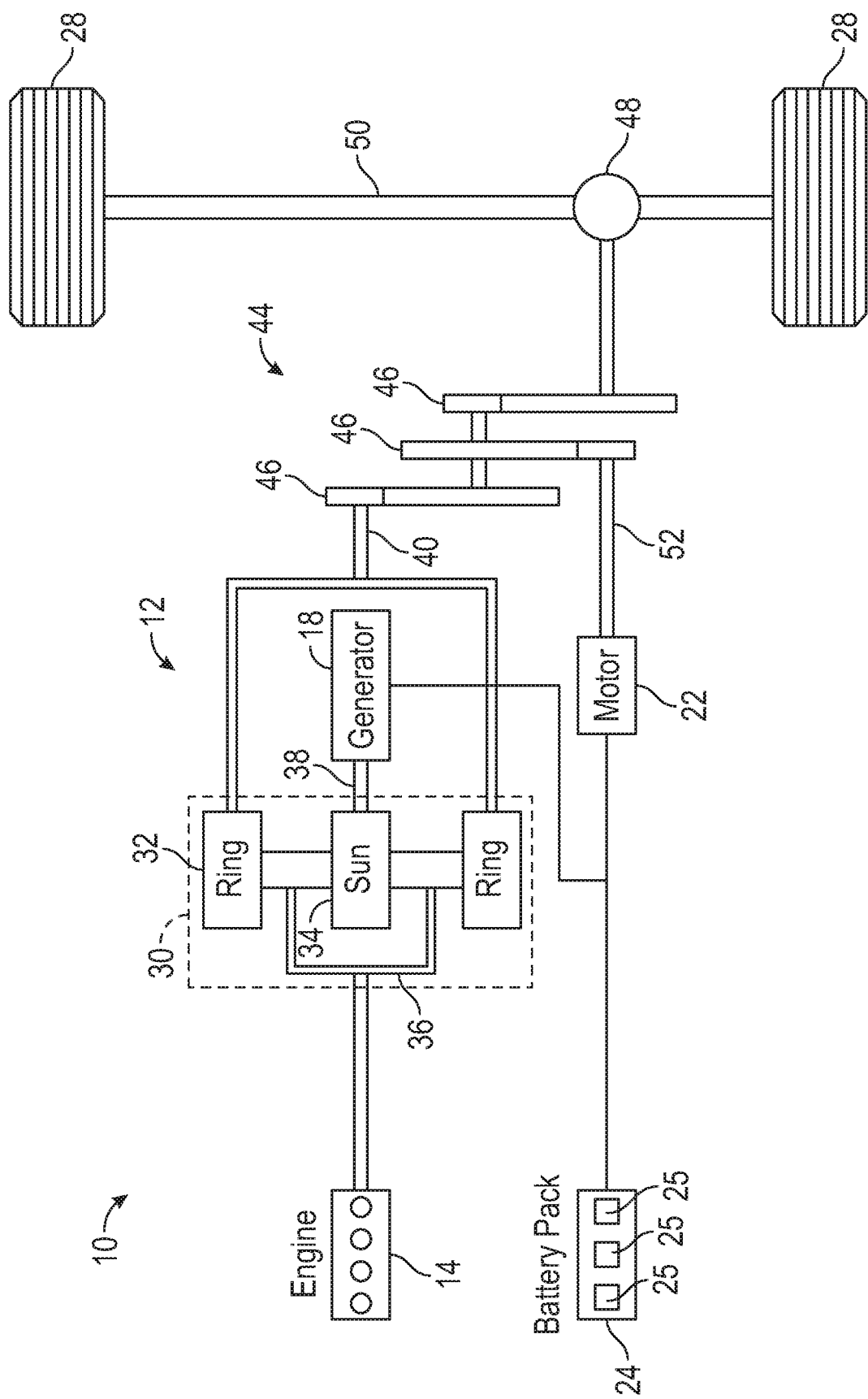
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
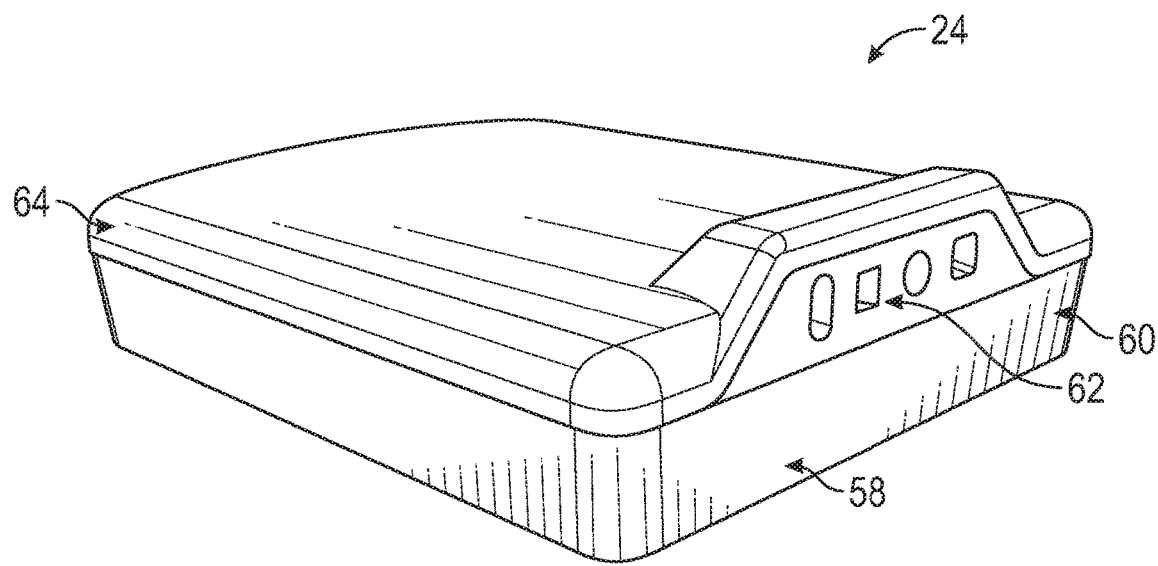
FIG. 2 illustrates a battery pack of an electrified vehicle.
Figure 3:
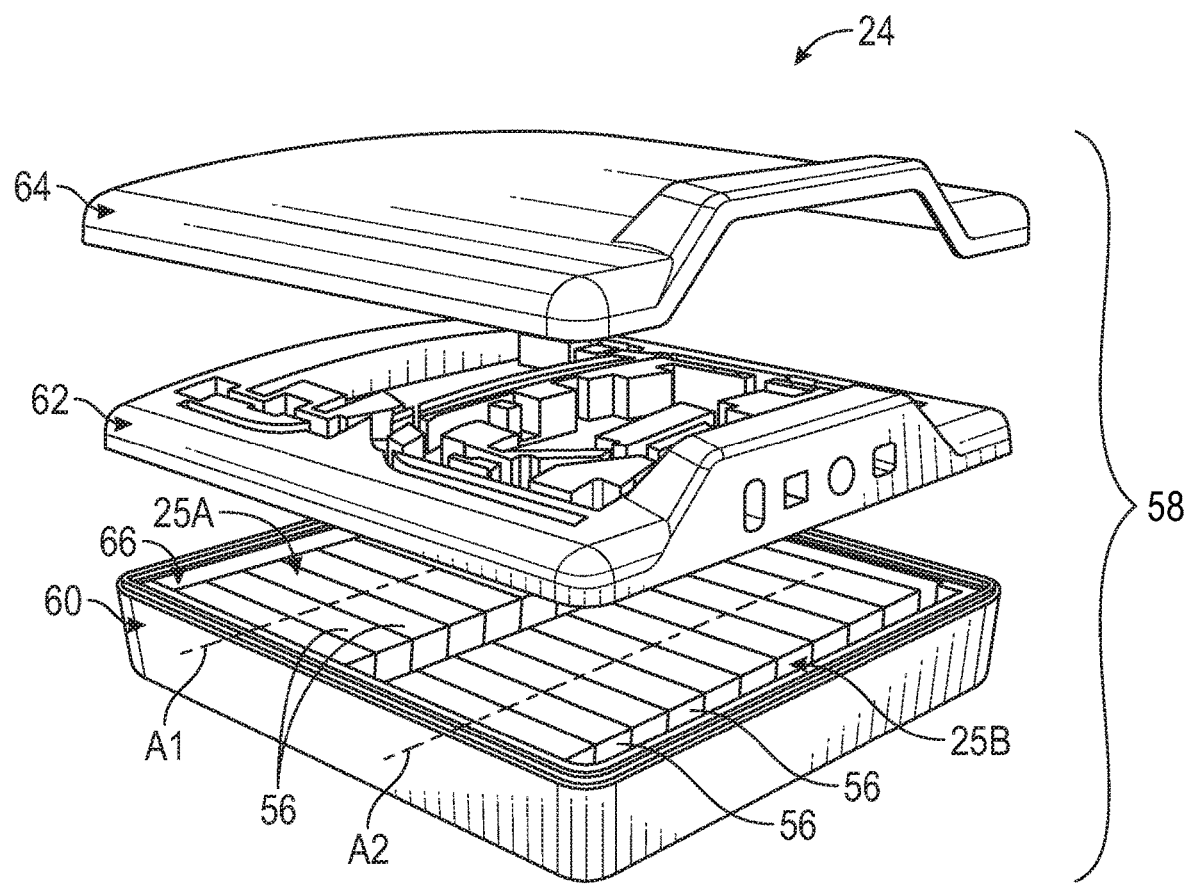
FIG. 3 is an exploded view of the battery pack of FIG. 2.

FIGS. 2 and 3 schematically illustrate a battery pack 24 that can be employed within an electrified vehicle. For example, the battery pack 24 could be part of the powertrain 10 of the electrified vehicle 12 of FIG. 1. FIG. 2 is a perspective view of the battery pack 24, and FIG. 3 is an exploded view of the battery pack 24 for better illustrating the internal components of the battery pack 24.

The battery pack 24 houses a plurality of battery cells 56 (see FIG. 3) that store energy for powering various electrical loads of the electrified vehicle 12. The battery pack 24 could employ any number of battery cells within the scope of this disclosure. Thus, this disclosure is not limited to the exact configuration shown in FIG. 3.

The battery cells 56 may be stacked side-by-side to construct a grouping of battery cells 56, sometimes referred to as a "cell stack" or "cell array." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery array or battery assembly. The battery pack 24 depicted in FIG. 3 includes a first battery array 25A and a second battery array 25B that is side-by-side with the first battery array 25A. Although the battery pack 24 of FIG. 3 is depicted as having a two battery arrays, the battery pack 24 could include a greater or fewer number of battery arrays and still fall within the scope of this disclosure.

The battery cells 56 of the first battery array 25A are distributed along a first longitudinal axis A1, and the battery cells 56 of the second battery array 25B are distributed along a second longitudinal axis A2. In an embodiment, the first longitudinal axis A1 is laterally spaced from the second longitudinal axis A2. The first and second battery arrays 25A, 25B are therefore positioned side-by-side relative to one another in this embodiment.

An enclosure assembly 58 houses each battery array 25A, 25B of the battery pack 24. In an embodiment, the enclosure assembly 58 is a sealed enclosure. The enclosure assembly 58 may include any size, shape, and configuration within the scope of this disclosure.

In an embodiment, the enclosure assembly 58 includes a tray 60, a mid-tray 62, and a cover 64. The tray 60, the mid-tray 62, and the cover 64 cooperate to surround and enclose the battery arrays 25A, 25B. The tray 60 provides an open area 66 to hold the battery arrays 25A, 25B. In an embodiment, the first and second battery arrays 25A, 25B are positioned within the open area 66 of the tray 60. The mid-tray 62 may then be seated and sealed onto the tray 60, such as via a tongue and groove connection, for example. The mid-tray 62 may be approximately the same width and length as the tray 60 such that it engages up to four sides of the tray 60 when seated onto it. The cover 64 may next be seated over the mid-tray 62 and sealed to it to enclose the battery arrays 25A, 25B. Once both are secured in their respective positions, the mid-tray 62 and the cover 64 are received together in a nesting fashion.

As shown in FIG. 2, a portion of the mid-tray 62 may be exposed outside of the enclosure assembly 58. However, the mid-tray 62 could alternatively be completely housed inside the enclosure assembly 58.

The enclosure assembly 58 could have other configurations within the scope of this disclosure. For instance, the mid-tray 62, the cover 64, or both could provide some of the open area 66 for receiving the first and second battery arrays 25A, 25B. In addition, although shown as being substantially rectangular, the enclosure assembly 58 could be triangular, round, etc.

In an embodiment, the tray 60 and the mid-tray 62 are constructed (e.g., molded) of an expanded polymer-based material, and the cover 64 is constructed (e.g., molded) of a solid polymer-based material. In another embodiment, the cover 64 is also constructed from an expanded polymer-based material. In yet another embodiment, the cover 64 is constructed from a metallic material. In yet another embodiment, the tray 60 is constructed from a solid polymer based material or a metallic based material.

Exemplary expanded polymer-based materials can include, but are not limited to, expanded polypropylene, expanded polystyrene, and expanded polyethylene. Generally, these polymer-based materials are considered relatively structural foamed polymer-based materials.

Exemplary solid polymer-based materials can include, but are not limited to, sheet moulding compounds (e.g., glass-fiber reinforced polyester), polypropylene, and polyamine. Generally, these polymer-based materials are considered more rigid than the expanded polymer based materials discussed above.

Figure 4:
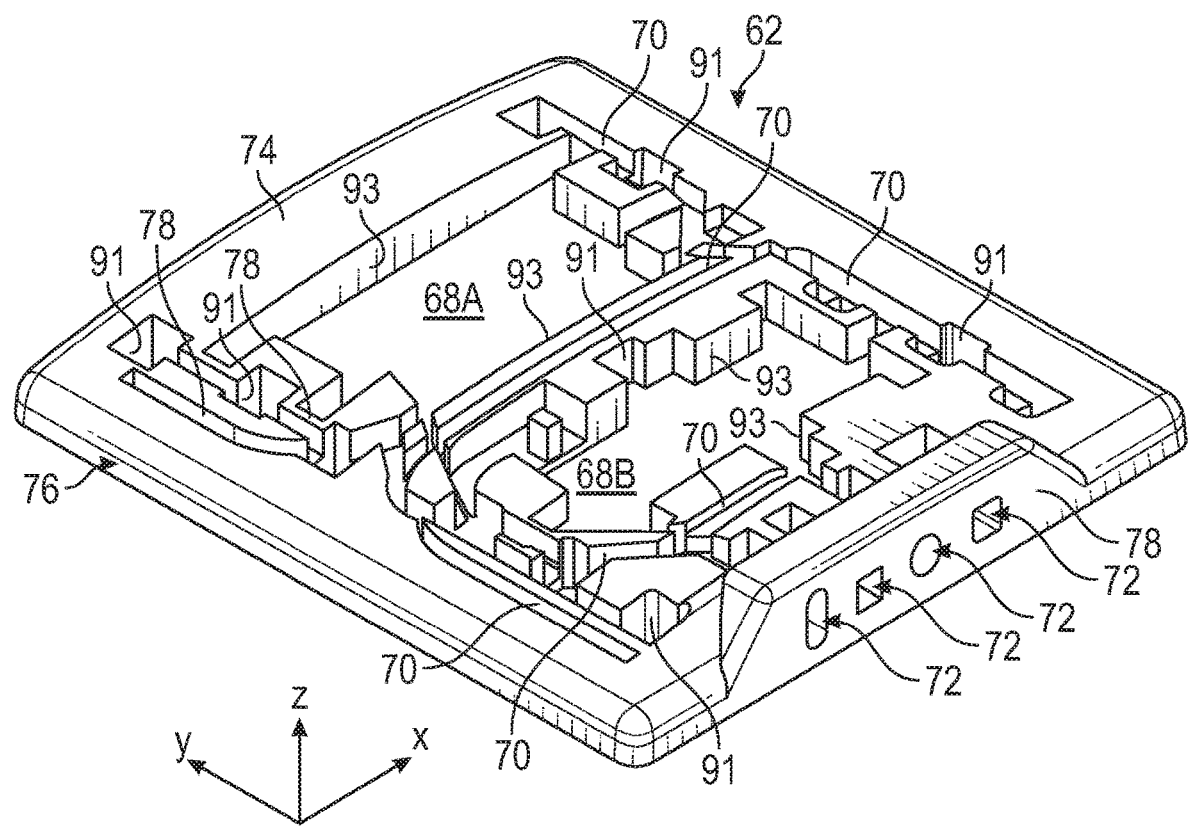
FIG. 4 illustrates a mid-tray of the battery pack of FIG. 2.

FIG. 4, with continued reference to FIGS. 2 and 3, illustrates additional details of the mid-tray 62 of the enclosure assembly 58. The mid-tray 62 may include various molded-in features for routing and/or retaining internal components within the mid-tray 62. The size, shape, location, and configuration of the molded-in features shown in FIG. 4 are exemplary only and are not intended to limit this disclosure.

In an embodiment, the mid-tray 62 includes pockets 68A, 68B, channels 70, and core holes 72 that are each designed to accommodate one or more internal components of the battery pack 24. The pockets 68A, 68B and the channels 70 may be formed within an upper surface 74 of the mid-tray 62. The upper surface 74 faces toward the cover 64 when the mid-tray 62 is positioned within the enclosure assembly 58. Some of the pockets 68 or the channels 70 could extend through or be formed in a lower surface 76 of the mid-tray 62. The core holes 72 may be formed through a side wall 78 of the mid-tray 62. In another embodiment, the core holes 72 are formed through a trough in the upper surface 74 or the lower surface 76 of the mid-tray 62. In yet another embodiment, the core holes 72 may have a slot cut into them from the top edge to the hole for sliding internal components into the core holes 72.

Figure 5:
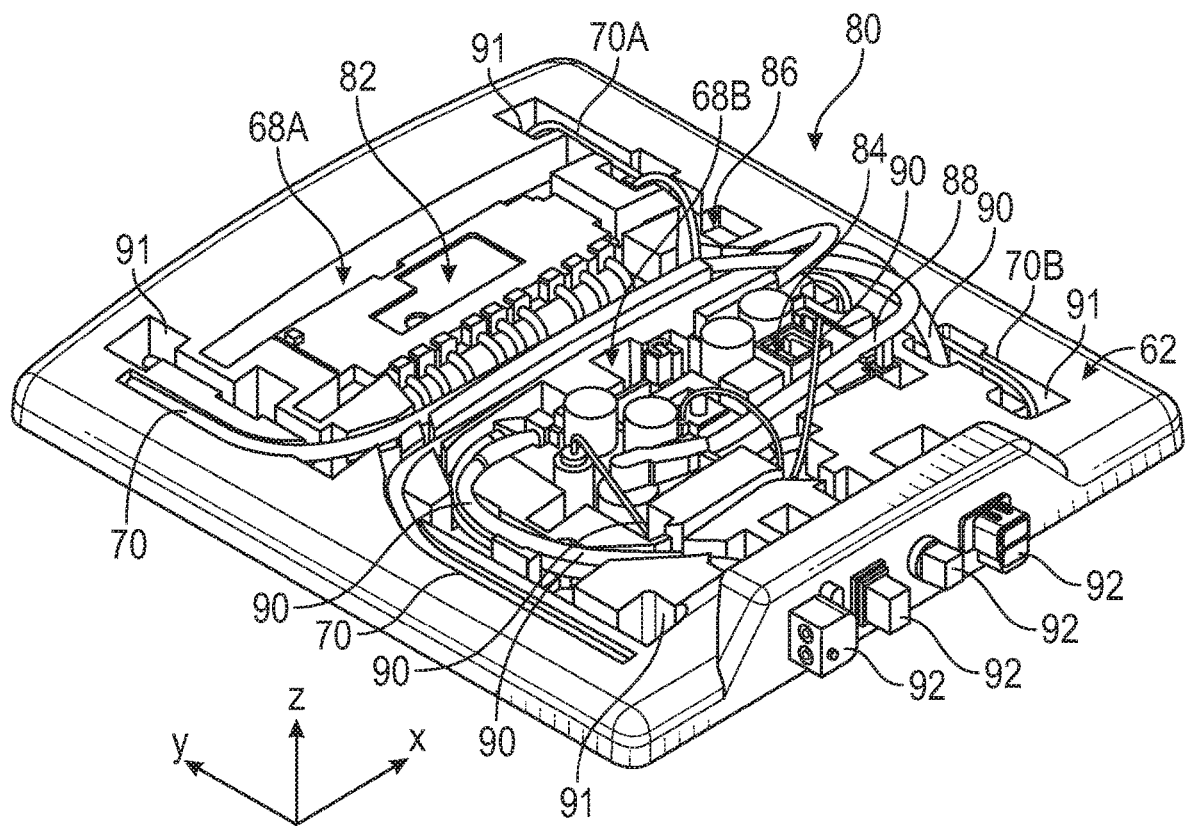
FIG. 5 illustrates the mid-tray of FIG. 4 packaged together with a plurality of internal components for establishing an electrical subassembly.

FIG. 5 illustrates the mid-tray 62 and a plurality of internal components (see features 82 through 88) packaged together to establish an electrical subassembly 80. The mid-tray 62 and the internal components can be preassembled together to form the electrical subassembly 80 before final assembly of the enclosure assembly 58. In this way, the mid-tray 62 and the internal components are already packaged together when the enclosure assembly 58 is assembled during manufacturing. Thus, the electrical subassembly 80 increases line efficiency by allowing the mid-tray 62 and the internal components to be assembled in parallel to the rest of the battery pack 24, thereby decreasing manufacturing complexity and cost.

In an embodiment, the internal components that may be packaged within the mid-tray 62 include a bussed electrical center (BEC) 82, a battery electric control module (BECM) 84, a first wiring harness 86, a second wiring harness 88, a plurality of wiring looms 90, and a plurality of I/O connectors 92. Of course, other internal components could also be retained within the mid-tray 62. The BEC 82 and the BECM 84 may be secured within respective pockets 68A, 68B of the mid-tray 62, the wiring harnesses 86, 88 and the wiring looms 90 may be secured within respective channels 70 of the mid-tray 62, and the I/O connectors 92 may be secured within respective core holes 72 of the mid-tray 62.

The internal components 82-88 may be routed and/or retained within the mid-tray 62 to assemble the electrical subassembly 80 in the following non-limiting manner. First, the BEC 82 is inserted into a first pocket 68A and the BECM 84 is inserted into a second pocket 68B of the mid-tray 62. The first wiring harness 86 is next inserted into a channel 70A of the mid-tray 62 and is connected to the BEC 82. The wiring looms 90 are then routed through their respective channels 70, snaked through one of the core holes 72, and then connected to one of the I/O connectors 92. Alternatively, the I/O connectors 92 may be pre-assembled to the wiring looms 92 in which case the assembly process would include feeding the wiring looms 90 through the core holes 72 first and then positioning the wiring looms 90 within their respective channels 70. Finally, the second wiring harness 88 is inserted into a channel 70B of the mid-tray 62 and is connected to the BECM 84.

In another embodiment, the pockets 68A, 68B and the channels 70 each include finger clearances 91 that are molded into the mid-tray 62. The finger clearances 91 make it easier for an assembly worker to route and retain the electronic components 82-88 relative to the mid-tray 62 during the assembly process.

Figure 6A:
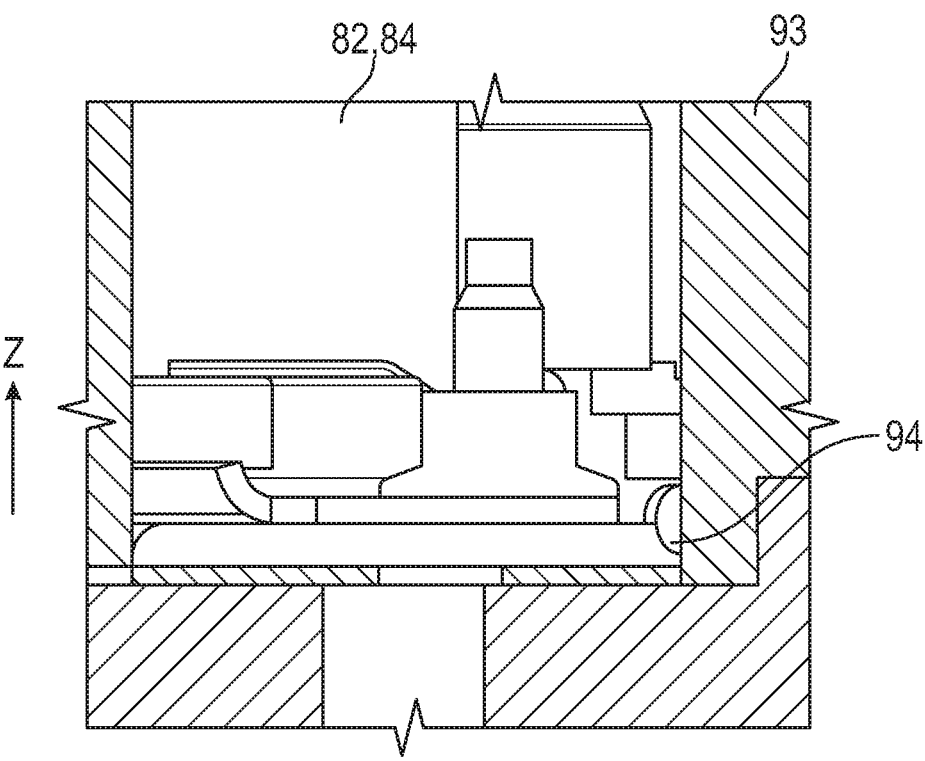
FIGS. 6A and 6B illustrate exemplary snap-in retaining features of the mid-tray of FIGS. 4 and 5.
Figure 6B:
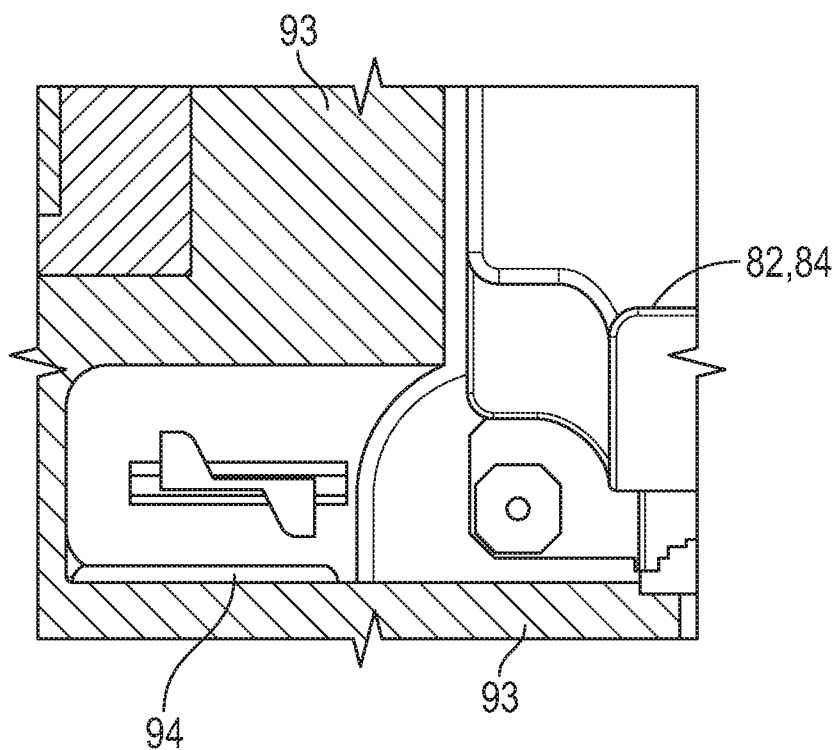

Each of the first pocket 68A and the second pocket 68B include pocket walls 93 (see FIGS. 6A and 6B) for retaining the internal components (here, features 82 and 84) in the X and Y directions. The first and second pockets 68A, 68B may additionally include snap-in features that are molded into the pocket walls 93 for retaining the internal components in the Z direction. For example, as shown in FIGS. 6A and 6B, one or more protrusions 94 may protrude inwardly from the pocket walls 93. As the BEC 82 and the BECM 84 are inserted into the pockets 68A, 68B, respectively, these components are snap-fit into place and retained from further movement in the Z direction.

Figure 7:
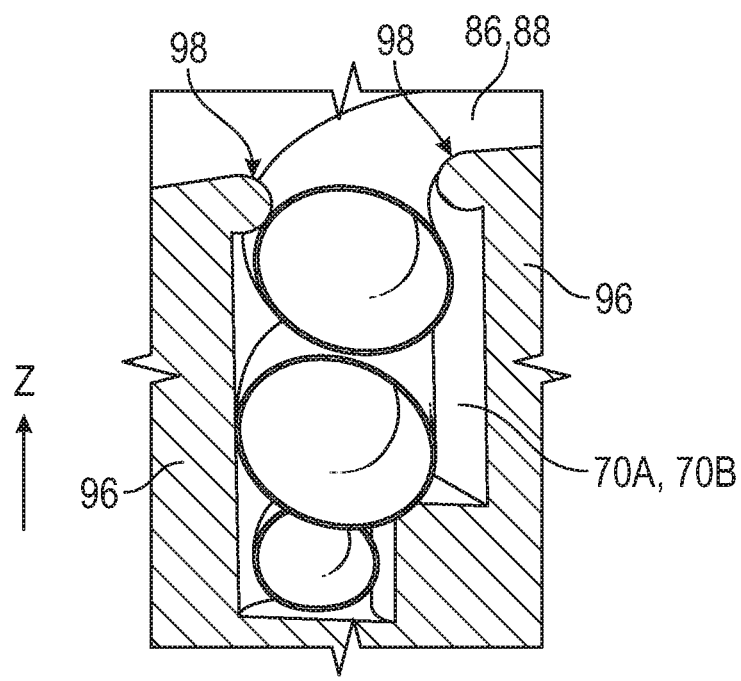
FIG. 7 illustrates another exemplary snap-in retaining feature of the mid-tray of FIGS. 4 and 5.

In addition, each of the channels 70A, 70B include channel walls 96 for retaining the internal components (here, features 86 and 88) in the X and Y directions. The channels 70A, 70B may additionally include snap-in features that are molded into the channel walls 96 for retaining the internal components in the Z direction. For example, as shown in FIG. 7, one or more protrusions 98 may protrude inwardly from the channels walls 96. The first and second wiring harnesses 86, 88 may therefore be snap-fit into place and retained from further movement in the Z direction within the channels 70A, 70B, respectively, as these components are inserted into mid-tray 62. The channels 70 containing the wiring looms 90 may also include snap-in features for retaining the wiring looms 90 in the Z direction.

Since the internal components of the electrical subassembly 80 are mechanically retained in the X, Y, and Z directions by the protrusions 94, 98 and the walls 93, 98, there is no need for additional fasteners to retain any of the components within the mid-tray 62.

Figure 8:
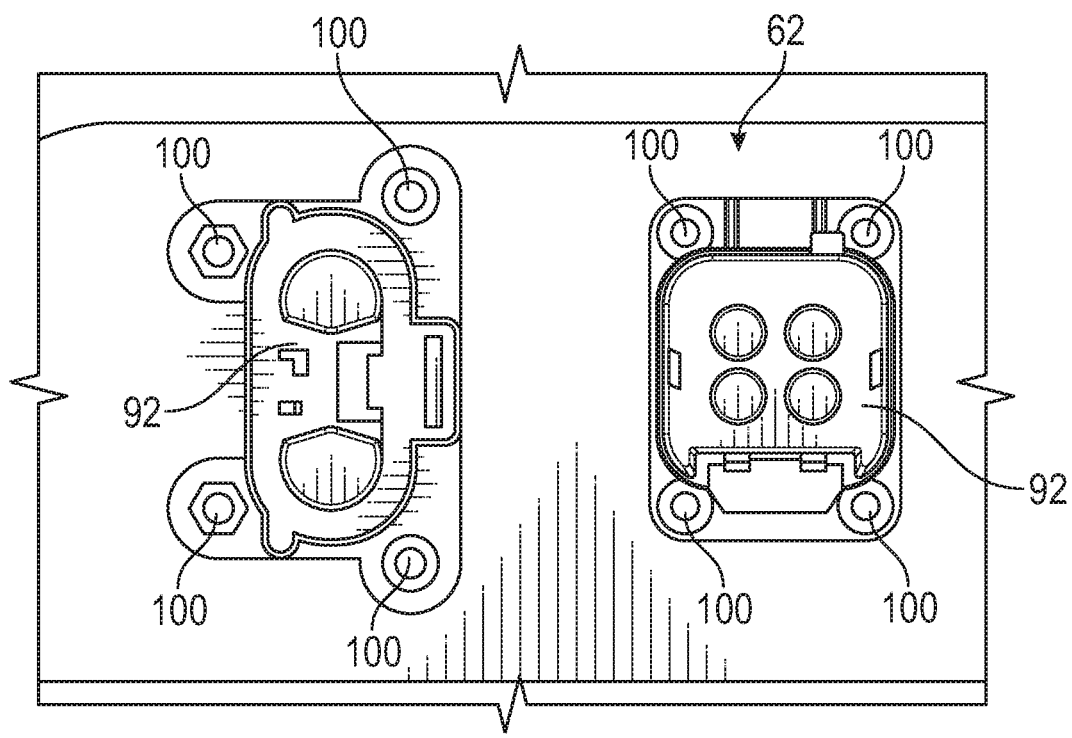
FIG. 8 illustrates exemplary I/O connectors retained to a wall of the mid-tray of FIGS. 4 and 5.
Figure 9:
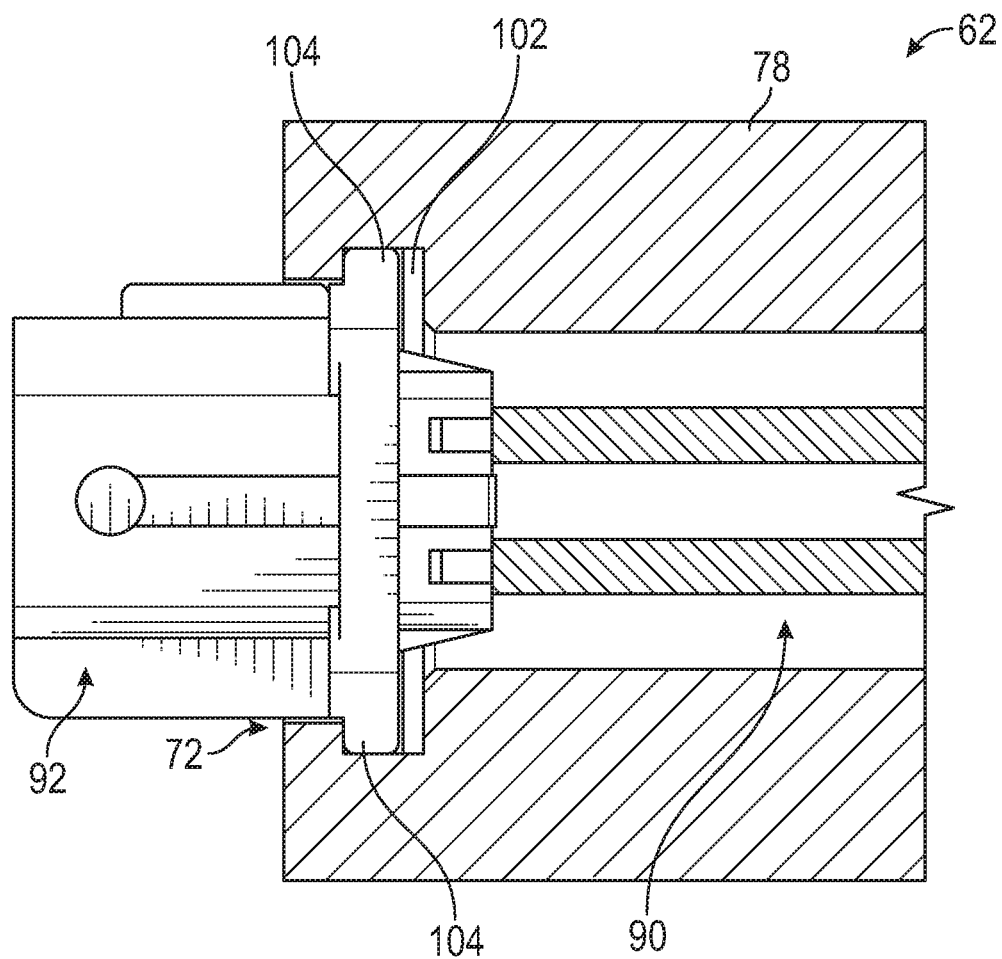
FIG. 9 illustrates another exemplary I/O connector retained to a wall of the mid-tray of FIGS. 4 and 5.

Referring now to FIG. 8, the I/O connectors 92 (only two shown) may be retained within the core holes 72 using one or more fasteners 100. Alternatively, as shown in FIG. 9, a receiving pocket 102 may be molded into the side wall 78 of the mid-tray 62. When the I/O connector 92 is inserted into the core hole 72, a flange 104 of the I/O connector 92 seats within the receiving pocket 102, thereby retaining the I/O connector 92 within its respective core hole 72.

The exemplary battery packs of this disclosure include enclosure assemblies that utilize mid-trays for packaging electric subassemblies within the enclosure assembly. This affords the ability to assembly the electric subassemblies in parallel with the battery pack assembly during manufacturing. The proposed designs reduce the number of overall parts in assembly, increase energy absorption and electrical insulation capabilities of the battery pack, and simplify the overall battery pack manufacturing process.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   a battery array;
   an enclosure assembly housing the battery array and including a tray, a cover, and a mid-tray; and
   a plurality of internal components secured within the mid-tray to establish an electrical subassembly within the enclosure assembly,
   wherein the mid-tray is secured and sealed to the tray via a tongue and groove connection,
   wherein the plurality of internal components includes a bussed electrical center (BEC), a battery electric control module (BECM), a wiring harness, and an I/O connector,
   wherein at least a portion of the mid-tray is exposed outside of the enclosure assembly,
   a first pocket formed in the mid-tray and including a first pocket wall and a first protrusion that protrudes inwardly from the first pocket wall, wherein the first protrusion retains the BEC from movement in at least one direction;
   a second pocket formed in the mid-tray and including a second pocket wall and a second protrusion that protrudes inwardly from the second pocket wall, wherein the second protrusion retains the BECM from movement in at least one direction;
   a channel formed in the mid-tray and including a channel wall and a third protrusion that protrudes inwardly from the channel wall, wherein the third protrusion retains the wiring harness from movement in at least one direction; and
   a core hole formed in the mid-tray and configured to receive the I/O connector.

2. The battery pack as recited in claim 1, wherein the tray is an expanded polymer-based tray, the mid-tray is an expanded polymer-based mid-tray, and the cover is a solid polymer-based cover.

3. The battery pack as recited in claim 2, wherein the mid-tray is made of expanded polypropylene.

4. The battery pack as recited in claim 2, wherein the cover is made of a sheet moulding compound.

5. The battery pack as recited in claim 1, wherein the cover is received in nesting fashion with the mid-tray.

6. The battery pack as recited in claim 1, wherein one of the plurality of internal components includes a flange that is seated within a receiving pocket molded into the mid-tray.

7. The battery pack as recited in claim 1, wherein the cover is sized to cover an entire upper surface of the mid-tray.

8. The battery pack as recited in claim 1, wherein a first length and a first width of the mid-tray is substantially equivalent to a second length and a second width, respectively, of the tray, and wherein a third length and a third width of the cover is substantially equivalent to the first length and the first width, respectively, of the mid-tray.

9. The battery pack as recited in claim 1, wherein the electrical subassembly is a fastenerless electrical subassembly that excludes any fasteners separate from integrally molded features of the mid-tray.

10. The battery pack as recited in claim 1, wherein the portion of the mid-tray that is exposed outside of the enclosure assembly is a side wall that includes the core hole.

11. The battery pack as recited in claim 1, comprising a wiring loom that connects the wiring harness to the I/O connector.

12. A battery pack, comprising:
a first battery array;
a second battery array adjacent to the first battery array;
an enclosure assembly housing the first and second battery arrays,
wherein the enclosure assembly includes a tray, a mid-tray secured to the tray, and a cover secured to the mid-tray,
wherein the tray and the mid-tray are constructed of an expanded polymer-based material and the cover is constructed of a solid polymer-based material that is more rigid than the expanded polymer-based material;
a first pocket formed in the mid-tray and including a first pocket wall and a first protrusion that protrudes inwardly from the first pocket wall;
a bussed electrical center (BEC) snap-fit within the first pocket and retained from movement in at least one direction by the first protrusion;
a second pocket formed in the mid-tray and including a second pocket wall and a second protrusion that protrudes inwardly from the second pocket wall;
a battery electric control module (BECM) snap-fit within the second pocket and retained from movement in at least one direction by the second protrusion;
a channel formed in the mid-tray and including a channel wall and a third protrusion that protrudes inwardly from the channel wall;
a wiring harness snap-fit within the channel and retained from movement in the at least one direction by the third protrusion, wherein the wiring harness is connected to either the BEC or the BECM;
a core hole formed in the mid-tray;
an I/O connector secured within the core hole; and
a wiring loom that connects the wiring harness to the I/O connector.

13. A method, comprising:
securing a mid-tray to a tray of a battery pack enclosure assembly;
establishing an electrical subassembly inside the battery pack enclosure assembly,
wherein establishing the electrical subassembly includes:
positioning a bussed electrical center (BEC) within a first pocket of the mid-tray;
routing and securing a first wiring harness within a first channel of the mid-tray; and
connecting the first wiring harness to the BEC; and
securing a cover over the mid-tray such that at least a portion of the mid-tray is exposed outside of the enclosure assembly,
wherein, once secured in place, the cover extends over top of an entire upper surface of the mid-tray to conceal the electrical subassembly inside the battery pack enclosure assembly.

14. The method as recited in claim 13, wherein establishing the electrical subassembly includes positioning a battery electric control module (BECM) within a second pocket of the mid-tray.

15. The method as recited in claim 13, wherein establishing the electrical subassembly includes positioning a wiring loom within a second channel of the mid-tray, snaking the wiring loom through a core opening of the mid-tray, and then connecting an I/O connector to the wiring loom.

* * * * *